United States Patent [19]
Tomatsu et al.

[11] Patent Number: 6,012,300
[45] Date of Patent: Jan. 11, 2000

[54] PRESSURE CONTROL VALVE FOR REFRIGERATING SYSTEM

[75] Inventors: Yoshitaka Tomatsu, Chiryu; Teruyuki Hotta, Nagoya; Hisayoshi Sakakibara; Yukikatsu Ozaki, both of Nishio, all of Japan

[73] Assignees: Denso Corporation, Kariya; Nippon Soken Inc., Nishio, both of Japan

[21] Appl. No.: 09/116,898

[22] Filed: Jul. 17, 1998

[30] Foreign Application Priority Data

Jul. 18, 1997 [JP] Japan ................................ 9-194383
Jul. 18, 1997 [JP] Japan ................................ 9-194384

[51] Int. Cl.$^7$ .................................................. F25B 41/04
[52] U.S. Cl. ........................................................ 62/222
[58] Field of Search .......................... 62/114, 204, 210, 62/211, 212, 222, 223, 224, 225

[56] References Cited

U.S. PATENT DOCUMENTS

| | | | |
|---|---|---|---|
| 2,481,968 | 9/1949 | Atchison | 62/222 |
| 2,503,922 | 4/1950 | Schumacher | 62/222 |
| 3,037,362 | 6/1962 | Tilney et al. | 62/222 |
| 4,205,532 | 6/1980 | Brenan | 62/115 |
| 4,236,669 | 12/1980 | Kountz | 62/224 |
| 4,507,934 | 4/1985 | Tanaka et al. | 62/222 |
| 5,081,847 | 1/1992 | Anderson, Jr. | 62/222 |
| 5,245,836 | 9/1993 | Lorentzen et al. | 62/174 |
| 5,626,030 | 5/1997 | Nagai | 62/222 |
| 5,890,370 | 4/1999 | Sakakibara et al. | 62/222 |

FOREIGN PATENT DOCUMENTS 1-193561A 8/1989 Japan .
7-18602 3/1995 Japan .

*Primary Examiner*—William E. Tapolcai
*Attorney, Agent, or Firm*—Pillsbury Madison & Sutro LLP

[57] ABSTRACT

A pressure control valve controlling the temperature and pressure at the outlet side of a heat emitter so as to enable efficient operation by a $CO_2$ system operating at the super critical region, wherein $CO_2$ is sealed in a closed space at one side of a diaphragm moving the valve element at a density of approximately 600 kg/m$^3$, a through member made of a material with a high heat conductivity is provided extending between the inside and outside of the closed space, and step differences are eliminated at the contact surfaces to improve the durability of the diaphragm.

11 Claims, 13 Drawing Sheets

PRESSURE AT OUTLET OF HEAT EMITTER (MPa)

PRESSURE CONTROL VALVE FOR REFRIGERATING SYSTEM

BACKGROUND OF THE INVENTION

1. Field of the Invention

The present invention relates to a pressure control valve for controlling a pressure on the outlet side of a heat emitter of a vapor compression type refrigerating system. The present invention is preferably used in a vapor compression type refrigerating system using a refrigerant such as carbon dioxide ($CO_2$) at a super critical region.

2. Description of the Related Art

In recent years, as one of the measures for abolishing the use of fluorocarbon refrigerants in vapor compression type refrigerating systems, for example, a vapor compression type refrigerating system using carbon dioxide ($CO_2$) (hereinafter referred to simply as a $CO_2$ system) as disclosed in Japanese Unexamined Patent Publication (Kokai) No. 7-18602 has been proposed.

This $CO_2$ system operates in the same way as the vapor compression type refrigerating systems of the related art using fluorocarbons. Namely, as indicated by A-B-C-D-A of FIG. 1 ($CO_2$ Mollier chart), $CO_2$ in the gas phase state is compressed by a compressor (A-B), then this high temperature, high pressure super critical state $CO_2$ is cooled by a heat emitter (gas cooler) (B-C). Next, the pressure is reduced by a decompressor (C-D) to cause the now two-phase gas and liquid state $CO_2$ to evaporate (D-A), rob the lateral heat of vaporization from the air or other external fluid, and thereby cool the external fluid. Note that, the $CO_2$ changes to the two-phase gas and liquid state when the pressure falls below a saturated liquid pressure (pressure at intersection of segment CD and a saturated liquid line SL), therefore where the phase slowly changes from the state of C to the state of D, the $CO_2$ changes from the super critical state to the two phase gas and liquid state through a liquid phase state.

Note that the "super critical state" means a state where the $CO_2$ molecules behave as if in the gas phase state even though the density is substantially equivalent to the liquid density.

However, the critical temperature of $CO_2$ is about 31° C. which is lower than the critical temperature of the fluorocarbons of the related art (for example, 112° C. in the case of R12), therefore the $CO_2$ temperature at the heat emitter side ends up becoming higher than the critical point temperature of $CO_2$ in the summer etc. That is, in this state, $CO_2$ is not condensed even at the outlet side of the heat emitter (the line segment BC does not intersect the saturated liquid line SL).

Further, the state at the outlet side of the heat emitter (C point) is determined by the outlet pressure of the compressor and the $CO_2$ temperature at the outlet side of the heat emitter, while the $CO_2$ temperature at the outlet side of the heat emitter is determined by the heat emitting capability of the heat emitter and the external temperature. However, the external temperature cannot be controlled, therefore the $CO_2$ temperature at the outlet side of the heat emitter cannot be controlled in practice.

Accordingly, the control of the state at the outlet side of the heat emitter (C point) becomes possible by controlling the outlet pressure of the compressor (or the pressure at the outlet side of the heat emitter). That is, where the external temperature is high as in the summer, in order to secure a sufficient cooling capability (enthalpy difference), as indicated by E-F-G-H-E of FIG. 1, it is necessary to make the pressure at the outlet side of the heat emitter high.

However, since the outlet pressure of the compressor must be made high in order to make the pressure at the outlet side of the heat emitter high as mentioned above, the compression work of the compressor (change of enthalpy $\Delta L$ of the compression step) is increased. Accordingly, where the increase of the change of enthalpy $\Delta L$ of the compression step (A-B) is larger than the increase of the change of enthalpy $\Delta i$ of the evaporation step (D-A), the coefficient of performance of the $CO_2$ system (COP=$\Delta i/\Delta L$) is degraded.

Therefore, if the $CO_2$ temperature at for example the outlet side of the heat emitter is set to 40° C. and a trial calculation is made of the relationship between the $CO_2$ pressure at the outlet side of the heat emitter and the coefficient of performance using FIG. 1, as indicated by a solid line in FIG. 2, the coefficient of performance becomes maximum at a pressure $P_1$ (about 10 MPa). Similarly, where the $CO_2$ temperature at the outlet side of the heat emitter is set to 35° C., as indicated by a broken line of FIG. 2, the coefficient of performance becomes maximum at a pressure $P_2$ (about 9.0 MPa).

As described above, when the $CO_2$ temperature at the outlet side of the heat emitter and the pressure at which the coefficient of performance becomes maximum are calculated and the result of this is plotted in FIG. 1, the relationship becomes as indicated by the bold solid line $\eta_{max}$ of FIG. 1 (hereinafter referred to as the optimum control line).

Accordingly, in order to operate the $CO_2$ system at a high efficiency, it is necessary to provide a pressure control valve for controlling the pressure at the outlet side of the heat emitter and the $CO_2$ temperature at the outlet side of the heat emitter as indicated by the optimum control line $\eta_{max}$.

Note that the Mollier chart of FIG. 1 is taken from the Fundamentals Handbook published by the American Society of Heating, Refrigerating and Air-conditioning Engineers.

SUMMARY OF THE INVENTION

In consideration of the above situation, an object of the present invention is to provide a pressure control valve for controlling the temperature at the outlet side of the heat emitter and the pressure at the outlet side of the heat emitter so that the vapor compression type refrigerating system operating in the super critical region operates at a high efficiency.

To achieve the above object, the present invention provides various pressure control valves for refrigerating systems as disclosed in the claims.

In all of the aspects of the invention disclosed in claims 1 to 11, the pressure control valve is provided with a through member (313) penetrating through a formation member (307) between an inside and an outside of a closed space (305) and made of a material having a larger heat conductivity than that of the formation member (307).

Further, since the through member (313) made of the material having a larger heat conductivity than that of the formation member (307) is arranged penetrating through the formation member (307) stretching from the inside to the outside of the closed space (305), the difference between the temperature in the closed space (305) and the temperature of a upstream space (301e) can be made small. Accordingly, the outlet side pressure of the heat emitter (2) is further raised to the temperature along the optimum control line $\eta_{max}$, therefore the $CO_2$ system can be efficiently operated.

According to the aspect of the invention disclosed in claim 2, a projection portion (317) is provided on an outer wall of the formation member (307), therefore not only is the formation member (307) reinforced by this and a high pressure resistance obtained, but also the thickness becomes smaller and, as a result, the heat conduction is promoted and the response to temperature changes becomes faster.

In the aspects of the invention disclosed in claims 3 to 5, a displacement member (306) is deformed and displaced to one side and the other side in a thickness direction of the displacement member (306) from a neutral state, therefore the maximum deformation and displacement of the displacement member (306) can be made smaller in comparison with the maximum displacement of a valve element (303).

Accordingly, in comparison with a case where the displacement member (306) is deformed and displaced to only one side in the thickness direction from the neutral state, the maximum stress generated in the displacement member (306) can be made smaller, therefore the vapor compression type refrigerating system can be efficiently operated even in the super critical region while improving the durability of the displacement member (306).

Note that the "neutral state" of the displacement member (306) means a state where the displacement member (306) does not deform or displace and where the stress along with the deformation and displacement is substantially zero.

In the aspects of the invention disclosed in claims 6 to 7, the refrigerant is sealed in the closed space (305) in a density within a range from the saturated liquid density when the temperature of the refrigerant is 0° C. to the saturated liquid density at a critical point of the refrigerant with respect to the volume in the closed space (305) in the state where the valve port (303) is closed.

By this, the characteristics of the refrigerant pressure and the refrigerant temperature in the closed space (305) substantially coincide with the optimum control line $\eta_{max}$. Accordingly, the pressure control valve (3) raises the outlet side pressure of the heat emitter (2) to a pressure substantially along the optimum control line $\eta_{max}$, then opens the valve port (303).

That is, since the outlet side pressure of the heat emitter (2) and the outlet side temperature of the heat emitter (2) are controlled substantially along the optimum control line $\eta_{max}$, the vapor compression type system can be efficiently operated even in the super critical region.

In the aspects of the invention disclosed in claims 8 to 10, a flat portion (308b) is formed at a position of the holding member (308) facing the displacement member (306), therefore there is little chance of a step difference arising between the holding member (308) and the valve element (304) and the flat portion (308b) and the surface (304a) of the valve element (304) are positioned in substantially the same plane.

Accordingly, as will be explained later, even when the pressure difference between the inside and outside of the closed space (305) becomes large during the assembly process, large deformation of the displacement member (306) between the flat portion (308b) and the surface (304a) can be suppressed, therefore damage of the displacement member (306) during the assembly process can be prevented.

Further, in the aspect of the invention disclosed in claim 9, a deformed portion (308a) formed to a shape following the deformed portion (306a) of the displacement member is formed at a position of the holding member (308) corresponding to the deformed portion (306a) of the displacement member, therefore large deformation of the displacement member (306) at the deformed portion (306a) due to the pressure difference between the inside and outside of the closed space (305) during the assembly process can be prevented, therefore damage of the displacement member (306) at the deformed portion (306a) can be prevented.

In the aspect of the invention disclosed in claim 10, a flat portion (307b) which forms substantially the same surface with respect to a surface (311a) in a rigid body (311) contacting with the displacement member (306) when the rigid body (311) and a stopper portion (307a) come in contact is formed in the formation member (307), therefore even when the pressure of the upstream space (301e) rises and the pressure difference between the inside and outside of the closed space (305) becomes large, large deformation of the displacement member (306) between the flat portion (307b) of the formation member and the surface 311a of the rigid body (311) can be suppressed.

Note that the aspect of the invention of claim 11 combines the gists of the aspects of the invention of claims 1, 3, and 6 together and combines their actions and effects together.

BRIEF DESCRIPTION OF THE DRAWINGS

These and other objects and features of the present invention will be explained in further detail below with reference to the description of the preferred embodiments given with reference to the attached drawings, in which:

FIGS. 10A and 10B are views of an upper support member of the pressure control valve according to a second embodiment of the present invention, in which FIG. 10A is a top view and FIG. 10B is a sectional view;

DESCRIPTION OF THE PREFERRED EMBODIMENTS

First Embodiment

Figure 3:
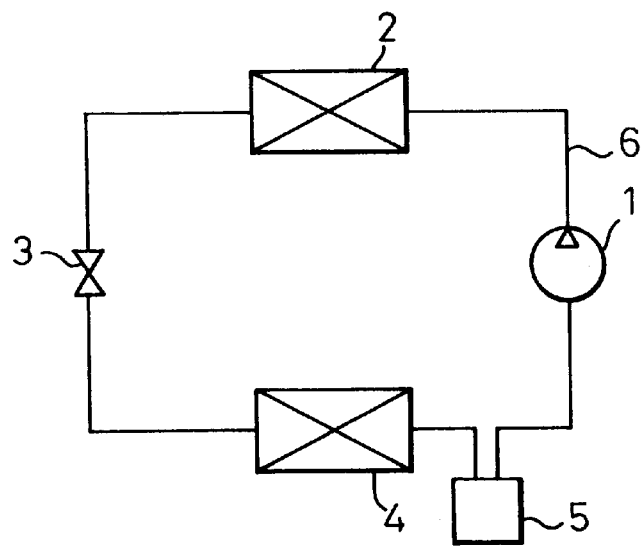
FIG. 3 is a schematic view of a refrigerating system using $CO_2$.

FIG. 3 shows a vehicular use air-conditioning apparatus to which a $CO_2$ system using the pressure control valve according to the present embodiment is applied. In the figure, 1 is a compressor for compressing $CO_2$ of a gas phase state, 2 is a heat emitter (gas cooler) for heat exchanging $CO_2$ compressed in the compressor 1 and an external air for cooling this, and 3 is a pressure control valve for controlling the pressure at the outlet side of the heat emitter 2 according to the $CO_2$ temperature at the outlet side of the heat emitter 2. Note that the pressure control valve 3 controls the outlet side pressure of the heat emitter 2 and, at the same time, acts as a decompressor. $CO_2$ is reduced in pressure by this pressure control valve 3 and becomes $CO_2$ of a two phase gas and liquid state having a low temperature and low pressure.

Reference numeral 4 is an evaporator (heat absorber) acting as an air cooling means in the cabin. $CO_2$ in the two-phase gas and liquid state robs the latent heat of vaporization from the air in the cabin to cools the air in the cabin when vaporized (evaporated) in the evaporator 4. Reference numeral 5 is an accumulator (tank means) for separating $CO_2$ of the gas phase state and $CO_2$ of the liquid phase state and, at the same time, temporarily accumulating $CO_2$ of the liquid phase state.

The compressor 1, heat emitter 2, pressure control valve 3, evaporator 4, and accumulator 5 are connected by a conduit 6 and form a closed circuit. Note that the compressor 1 obtains its drive force from a not illustrated drive source (engine, motor, etc.) to be driven. The heat emitter 2 is arranged in a forward part of the vehicle so as to make the temperature difference between the $CO_2$ in the heat emitter 2 and the external air as large as possible.

Next, the detailed configuration of the pressure control valve 3 will be explained by using FIG. 4.

Reference numeral 301 is a casing which forms part of a $CO_2$ flow path 6a from the heat emitter 2 to the evaporator 4 and, at the same time, accommodates an element case 315 explained later, 301a is an upper lid having an inflow port 301b connected to the heat emitter 2 side, and 301c is a casing body having an outflow port 301d connected to the evaporator 4 side.

Further, in the casing 301, a partition wall 302 is provided for partitioning the $CO_2$ flow path 6a into an upstream space 301e and a downstream space 301f. A valve port 303 for communicating the upstream space 301eand the downstream space 301f is formed in this partition wall 302.

The valve port 303 is opened or closed by a needle valve element (hereinafter referred to simply as a "valve element") 304. This valve element 303 and the diaphragm 306 explained later are constituted so that the opening degree of the valve port 303 (displacement of the valve element 304 with respect to a state where the valve port 303 is closed) becomes maximum when the diaphragm 306 displaces from the neutral state toward one side in the thickness direction and so that the valve port 303 is closed when the diaphragm 306 displaces toward the valve element 304 side (other side in the thickness direction of the diaphragm 306). Note that, here, the neutral state of the diaphragm 306 means a state where the diaphragm 306 does not deform and displace and the stress along with them is substantially zero.

Further, the closed space (gas sealing chamber) 305 is formed in the upstream space 301e. This closed space 305 is formed by the diaphragm (displacement member) 306, comprised of a thin film of stainless steel, which deforms and displaces in accordance with the pressure difference between the inside and outside of the closed space 305, and the upper support member (formation member) 307 arranged on one side in the thickness direction of the diaphragm 306.

Figure 5:
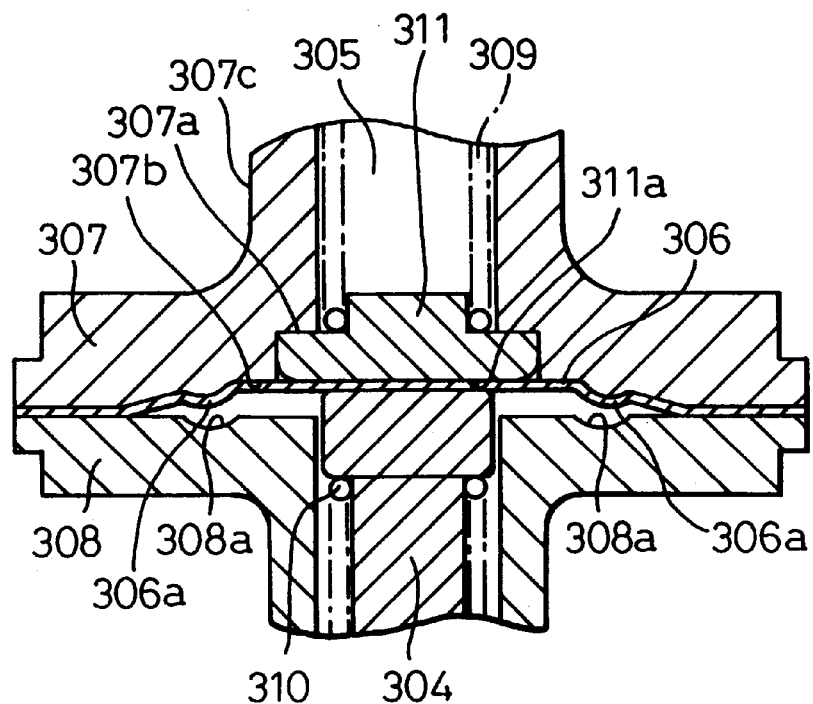
FIG. 5 is an enlarged view of a diaphragm part showing an opened valve state.
Figure 6:
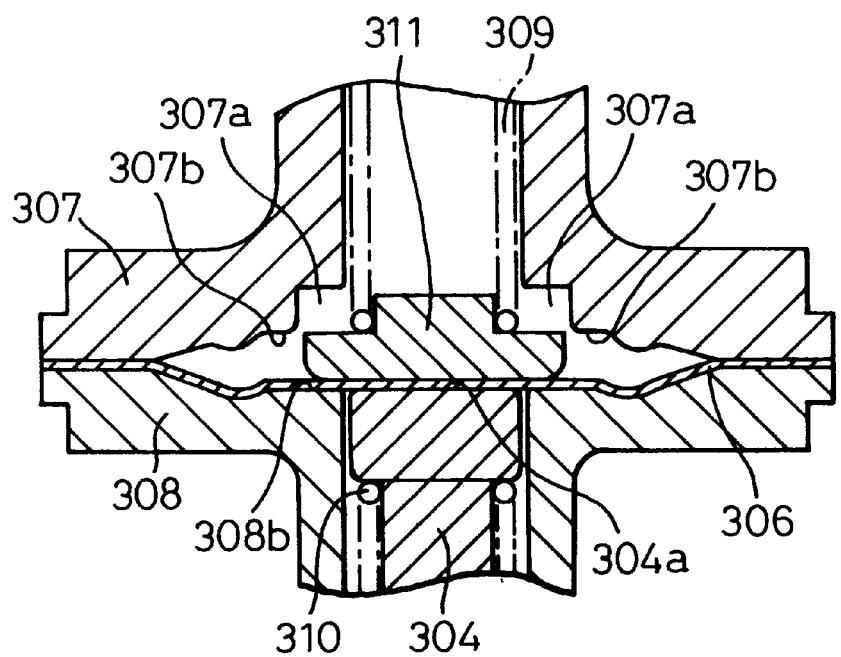
FIG. 6 is an enlarged view of the diaphragm part showing a closed valve state.

On the other hand, a diaphragm lower support member (holding member) 308 for holding and fixing the diaphragm 306 in place together with the diaphragm upper support member (hereinafter referred to simply as the "upper support member") 307 is arranged on the other side in the thickness direction of the diaphragm 306. At a position corresponding to a deformation promoting portion (displacement member deformation portion) 306a formed in the diaphragm 306 in this diaphragm lower support member (hereinafter referred to simply as the "lower support member") 308., as shown in FIGS. 5 and 6, a concave portion (holding member deformed portion) 308a formed shaped like the deformation promoting portion 306a is formed.

Note that the deformation promoting portion 306a is obtained by deforming part of the outward side of the diaphragm 306 in the diameter direction to a corrugated shape and is used to make the diaphragm deform and displace substantially in proportion to the pressure difference between the inside and outside of the closed space 305.

Further, at a position facing the diaphragm 306 in the lower support member 308 is formed a lower flat portion (holding member flat portion) 308b which forms substantially the same surface as the surface 304a in contact with the diaphragm 306 in the valve element 304 in a state where the valve port 303 is closed by the valve element 304.

Figure 4:
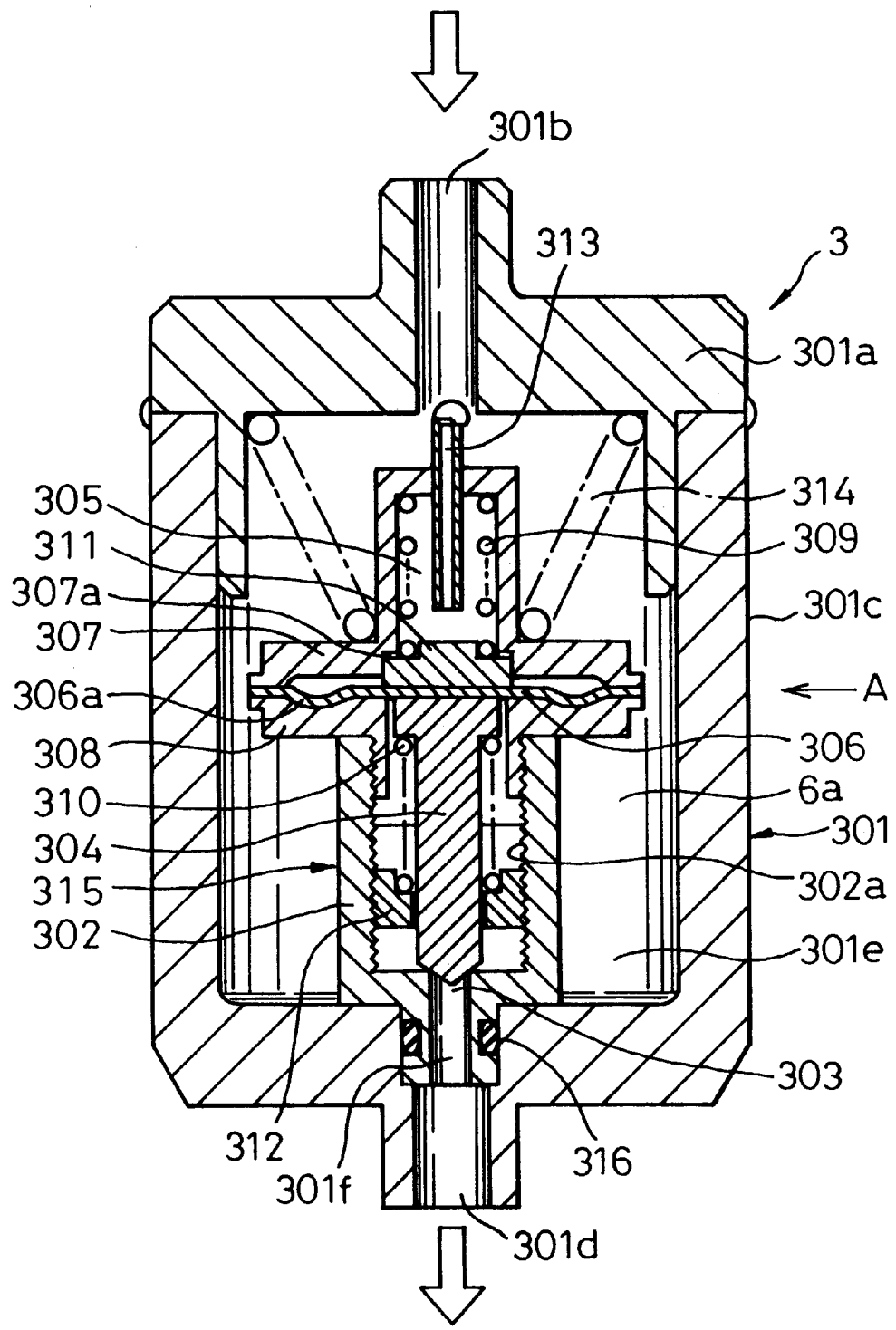
FIG. 4 is a sectional view of a pressure control valve according to a first embodiment of the present invention.

Further, on one side in the thickness direction of the diaphragm 306 (closed space 305), as shown in FIG. 4 is arranged a first coil spring (first elastic member) 309 for causing a biasing force of a direction closing the valve port 303 to act on the valve element 304 via the diaphragm 306, while on the other side in the thickness direction of the diaphragm 306 is arranged a second coil spring (second elastic member) 310 for causing a biasing force of a direction opening the valve port 303 to act on the valve element 304.

Reference numeral 311 is a plate (rigid body) serving also as a spring seat of the first coil spring 309. This plate 311 is constituted by a metal having a predetermined thickness so that the rigidity becomes higher than that of the diaphragm 306. The plate 311 contacts with a step portion (stopper portion) 307a formed in the upper support member 307 as shown in FIGS. 5 and 6 to limit the diaphragm 306 from displacing by more than a predetermined value toward one side of the thickness direction thereof (closed space 305 side).

The upper support member 307 is formed with an upper flat portion (formation member flat portion) 307b which forms substantially the same surface with respect to the surface 311a in contact with the diaphragm 306 in the plate 311 when the plate 311 and the step portion 307a come into contact. For instance, the inner wall of a cylindrical portion 307c of the upper support member 307 acts also as a guide portion of the first coil spring 309.

Note that the plate 311 and the valve element 304 are pressed against each other toward the diaphragm 306 by the two coil springs 309 and 310, therefore the plate 311, valve element 304, and diaphragm 306 integrally displace (operate) in a state in contact with each other.

In FIG. 4, reference numeral 312 is an adjustment screw (biasing force adjustment mechanism) which adjusts the biasing force of the second coil spring 310 acting on the valve element 304 and, at the same time, which serves as the plate of the second coil spring 310. This adjustment screw 312 is screwed into a female screw 302a formed in the partition wall 302. For instance, the initial load by the two coil springs 309 and 310 (biasing force in a state where the valve port 303 is closed) is about 1 MPa converted to pressure at the diaphragm 306.

Further, reference numeral 313 is a sealing pipe (through member) which extends between the inside and outside of the closed space 305 passing through the upper support member 307 and seals $CO_2$ in the closed space 305. This sealing pipe 313 is constituted by copper or another material having a heat conductivity larger than that of the stainless steel upper support member 307. Note that the lower support member 308 is also made of stainless steel.

The sealing pipe 313 is used to seal $CO_2$ at a density of about 600 kg/m³ with respect to the volume in the closed space 305 in the state where the valve port 303 is closed, then the end portion thereof is closed by welding or another bonding means.

Note that reference numeral 314 is a conical spring for affixing the element case 315 comprising the partition wall 302 to the sealing pipe 313 in the casing body 301c, while reference numeral 316 is an O-ring for filling the gap between the element case 315 (partition wall 302) and the casing body 301c.

Figure 7A:
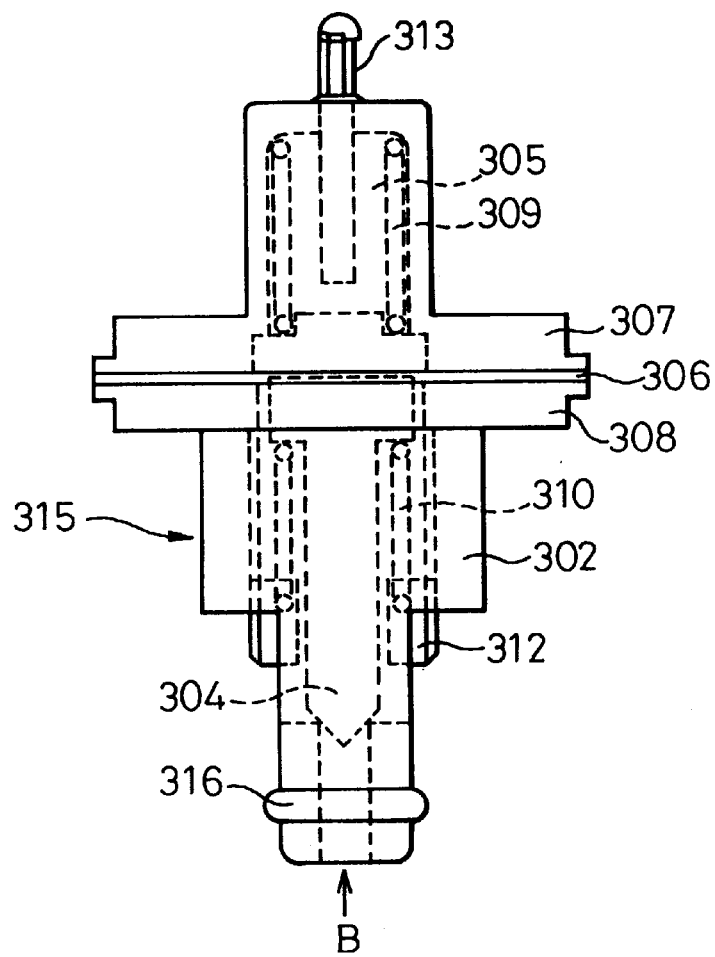
FIG. 7A is a perspective view taken along an arrow A of FIG. 4.
Figure 7B:
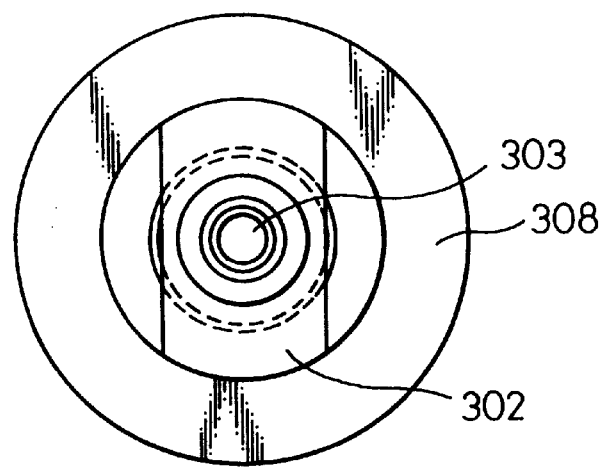
FIG. 7B is a perspective view taken along an arrow B of FIG. 7A.

Note that FIG. 7A is a perspective view of the element case 315 taken along an arrow A in FIG. 4; while FIG. 7B is a perspective view taken along an arrow B in FIG. 7A. As apparent from FIGS. 7A and 7B, the valve port 303 communicates with the upstream space 301e on the side surface of the partition wall 302.

Next, the operation of the pressure control valve 3 according to the present embodiment will be explained.

Figure 1:
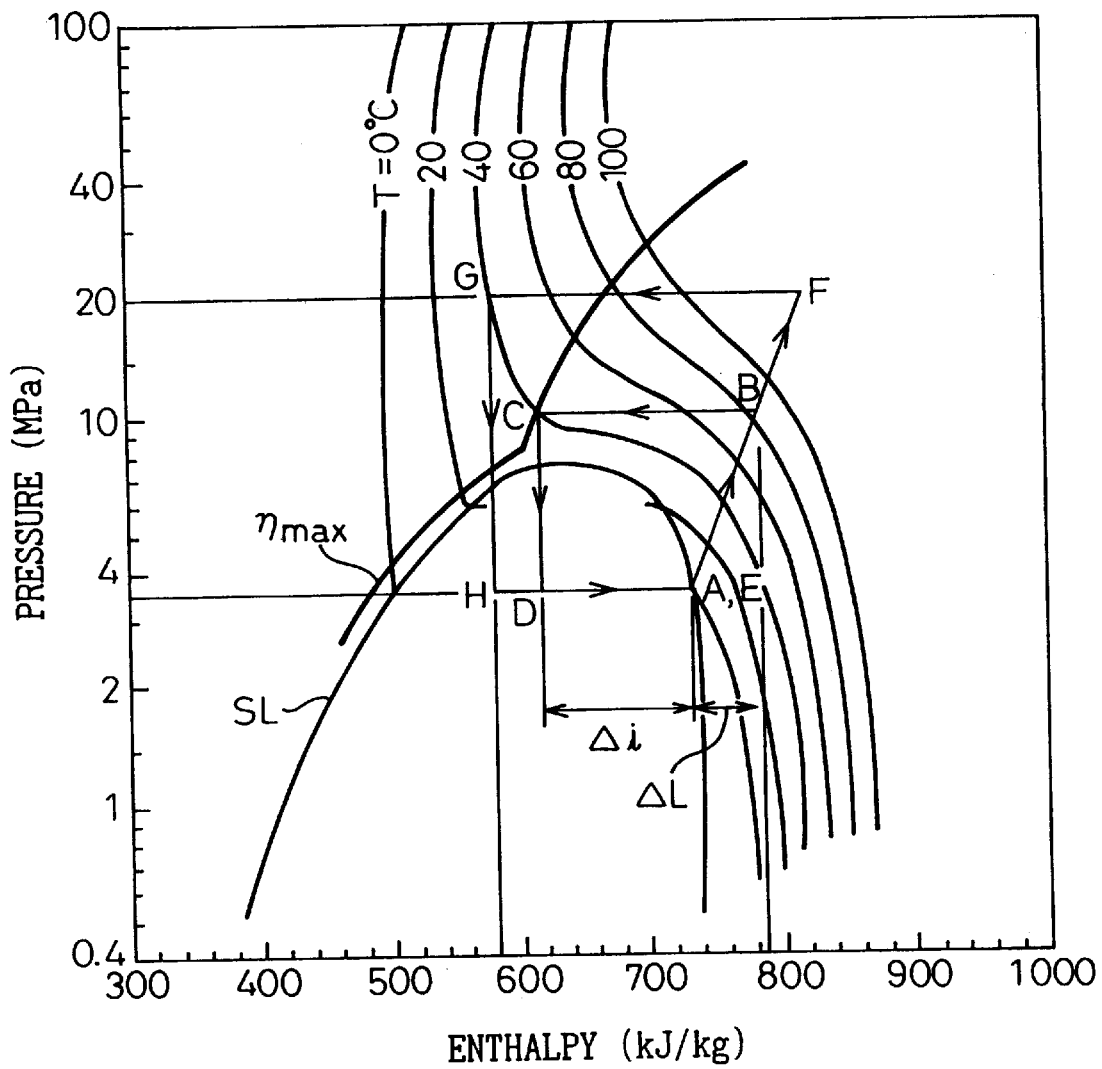
FIG. 1 is a Mollier chart of $CO_2$.
Figure 2:
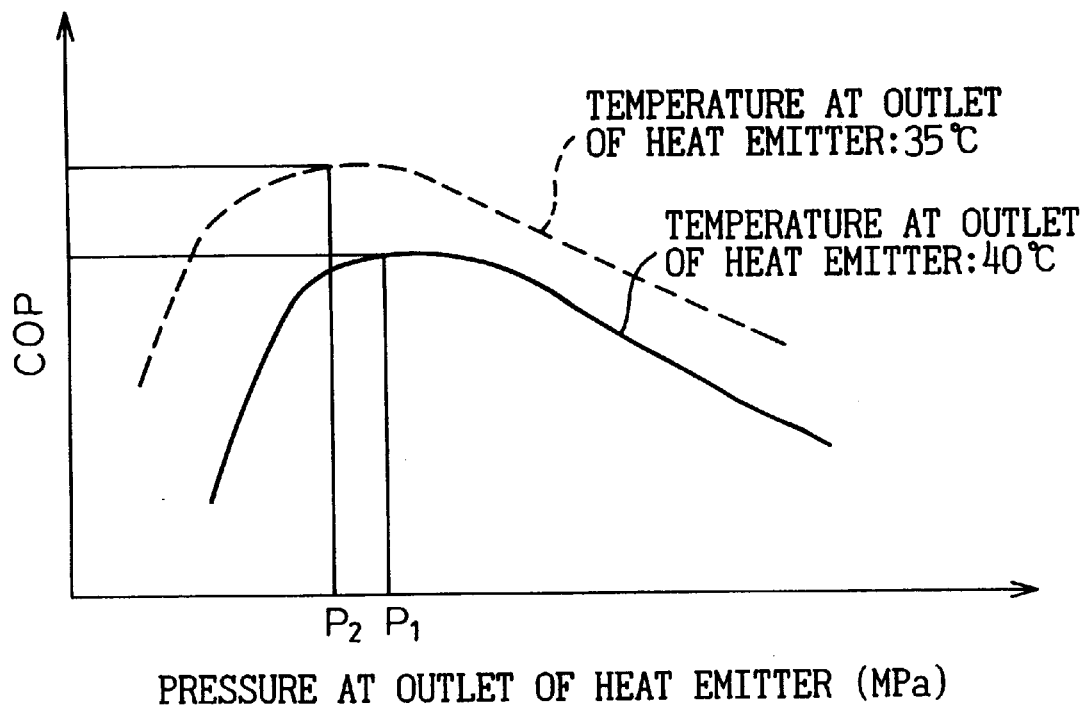
FIG. 2 is a graph of the relationship between a coefficient of performance (COP) and an outlet side pressure of a heat emitter.
Figure 8:
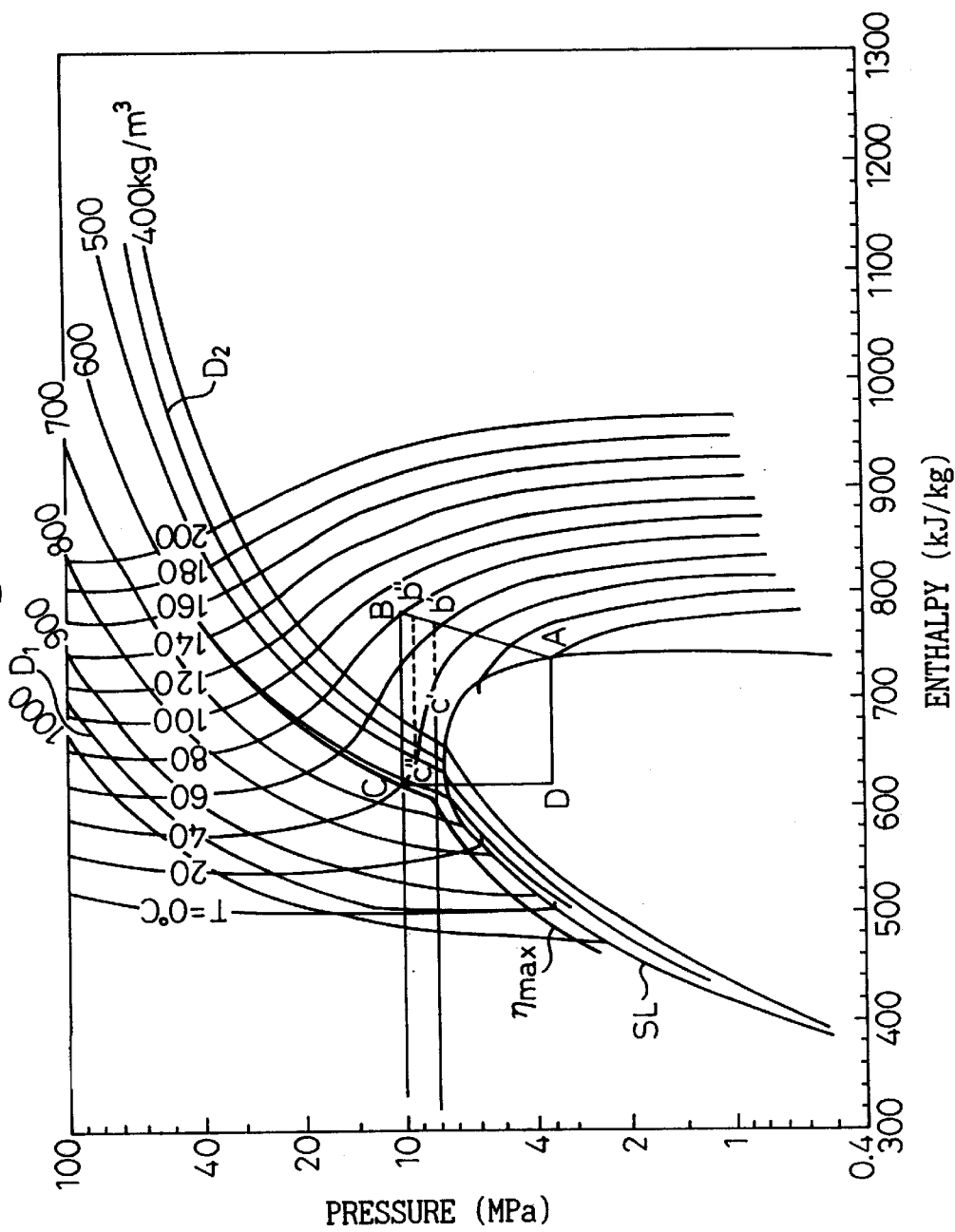
FIG. 8 is an explanatory view of the operation of a vapor compression type refrigerating system.

Since the $CO_2$ is sealed in the closed space 305 at about 600 kg/m³, the inside pressure and temperature of the closed space 305 change along an equi-density line of 600 kg/m³ shown in FIG. 1 and FIG. 8. Accordingly, where for example the temperature in the closed space 305 is 20° C., the inside pressure thereof is about 5.8 MPa. Further, since the inside pressure of the closed space 305 and the initial load by the two coil springs 309 and 310 simultaneously act upon the valve element 304, the operation pressure thereof is about 6.8 MPa.

Accordingly, where the pressure of the upstream space 301e of the heat emitter 2 side is 6.8 MPa or less, the valve port 303 is closed by the valve element 304. When the pressure of the upstream space 301e exceeds 6.8 MPa, the valve port 303 opens.

Similarly, where for example the temperature in the closed space 305 is 40° C., the inside pressure of the closed space 305 is, from FIG. 8, about 9.7 MPa, and the force acting upon the valve element 304 is about 10.7 MPa. Accordingly, when the pressure of the upstream space 301e is 10.7 MPa or less, the valve port 303 is closed by the valve element 304, while when the pressure of the upstream space 301e exceeds 10.8 MPa, the valve port 303 opens.

Next, the operation of the $CO_2$ system will be explained by using FIG. 8.

Here, when for example the outlet side temperature of the heat emitter 2 is 40° C. and the outlet pressure of the heat emitter 2 is 10.7 MPa or more, as mentioned above, the pressure control valve 3 is closed, therefore the compressor 1 draws in the $CO_2$ accumulated in the accumulator 5 and discharges it toward the heat emitter 2. By this, the outlet side pressure of the heat emitter 2 rises from (b'-c') to (b"-c").

Then, when the outlet side pressure of the heat emitter 2 finally exceeds 10.7 MPa (B-C), the pressure control valve 3 opens, therefore the $CO_2$ changes in phase from the gas phase state to the two-phase gas and liquid state (C-D) while falling in pressure and flows into the evaporator 4. Then, it is evaporated in the evaporator 4 (D-A) to cool the air, then is returned to the accumulator 5 again. At this time, since the outlet side pressure of the heat emitter 2 is lowered again, the pressure control valve 3 is closed again.

Namely, this $CO_2$ system boosts the outlet side pressure of the heat emitter 2 up to a predetermined pressure by closing the pressure control valve 3, then reduces the pressure of the $CO_2$ to cause it to evaporate and cool the air.

Note that when the outlet side temperature of the heat emitter 2 is 20° C. as well, in the same way as the operation mentioned above, the pressure control valve 3 raises the outlet side pressure of the heat emitter 2 to about 6.8 MPa and then opens.

Next, the characteristic feature of the present embodiment will be explained.

As explained above, the pressure control valve 3 according to the present embodiment raises the outlet side pressure of the heat emitter 2 up to the predetermined pressure and then opens. The control characteristic thereof largely depends upon the pressure characteristic of the closed space 305 of the pressure control valve 3.

As clear from FIG. 1 and FIG. 8, the equi-density line of 600 kg/m³ in the super critical region substantially coincides with the optimum control line $\eta_{max}$ explained in the section on the related art. Accordingly, since the pressure control valve 3 according to the present embodiment raises the outlet side pressure of the heat emitter 2 up to a pressure substantially along the optimum control line $\eta_{max}$, the $CO_2$ system can efficiently operate also in the super critical region.

Further, below the critical pressure, the deviation of the equi-density line of 600 kg/M³ from the optimum control line $\eta_{max}$ becomes large, but since this is the condensation region, the inside pressure of the closed space 305 changes along the saturated liquid line SL. Further, since the initial load is given to the valve element 304 by the two coil springs 309 and 310, it is controlled to a state having a supercooling degree of about 10° C. Accordingly, even below the critical pressure, the $CO_2$ system efficiently operate.

Figure 9:
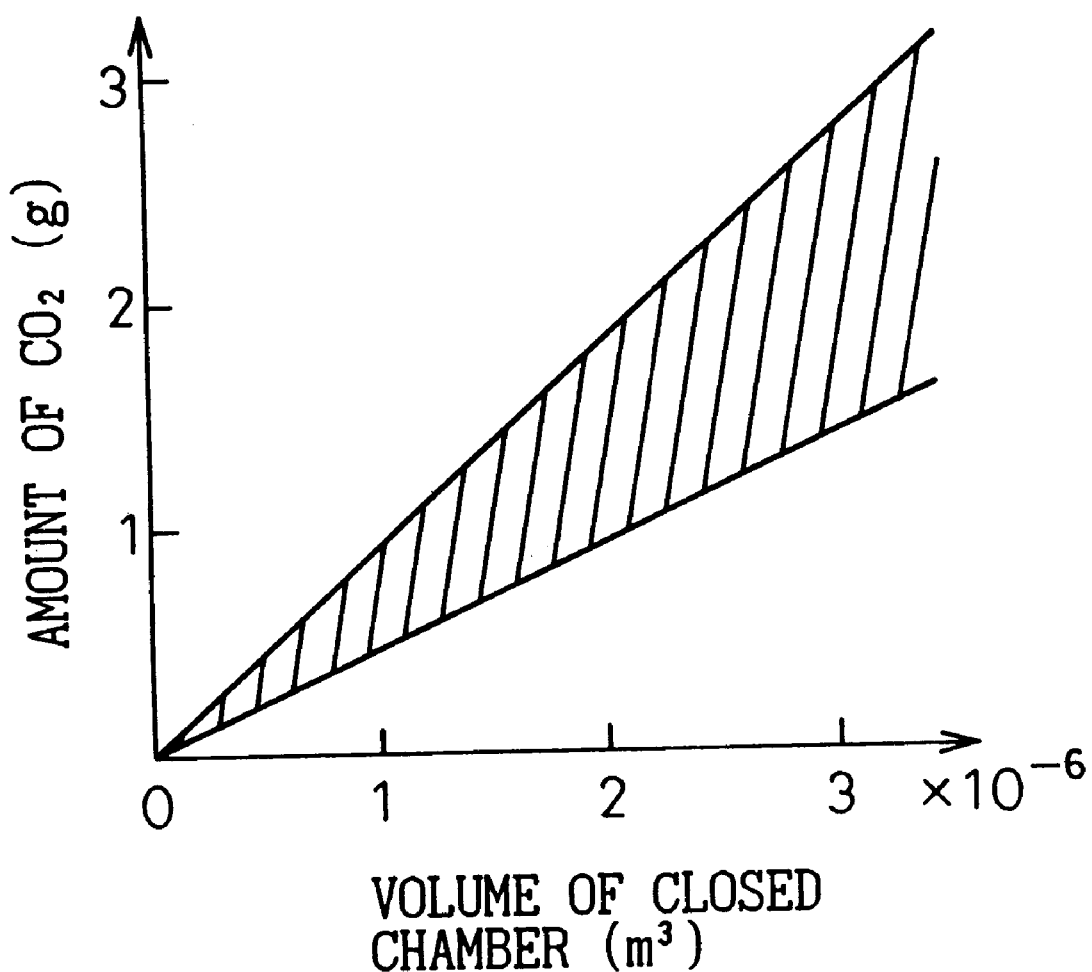
FIG. 9 is a graph of the relationship between a volume in a closed space and a mass of $CO_2$ sealed in this closed space.

Note that, in practice, the $CO_2$ is preferably sealed in the closed space 305 within a range from the saturated liquid density at a $CO_2$ temperature of 0° C. to the saturated liquid density at the critical point of $CO_2$. This range is specifically 450 kg/m³ to 950 kg/m³ in the case of $CO_2$ (range between lines $D_1$ and $D_2$ of FIG. 8). The relationship between the volume in the closed space 305 and the mass of the sealed $CO_2$ is the range shown by the hatching in FIG. 9.

Since the pressure difference between the inside and outside of the closed space 305 (difference between the atmospheric pressure and the pressure of the closed space 305) when the element case 315 is left to stand in the atmosphere by itself, that is, in the assembly process, is much larger than the pressure difference between the inside and outside of the closed space 305 where the pressure control valve 3 is installed in the $CO_2$ system ($CO_2$ flow path 6a) (pressure difference between the upstream space 301e and the closed space 305), there is a high possibility of damage to the diaphragm 306 in the assembly process.

As opposed to this, in the present embodiment, since the lower support member 308 is formed with the lower flat portion 308b which forms substantially the same surface with the surface 304a of the valve element 304 in the state where the valve port 303 is closed by the valve element 304, there is little chance of a step difference forming between the lower support member 308 and the valve element 304. The lower flat portion 308b and the surface 304a are located in substantially the same plane.

Accordingly, even when the pressure difference between the inside and outside of the closed space 305 becomes large during the assembly process, large deformation of the diaphragm 306 between the lower flat portion 308b and the surface 304a can be suppressed, therefore the damage of the diaphragm 306 during the assembly process can be prevented.

Further, similarly, since the lower support member 308 is formed with the concave portion 308a shaped like the deformation promoting portion 306a, large deformation of the diaphragm 306 in the deformation promoting portion 306a due to the pressure difference between the inside and outside of the closed space 305 during the assembly process can be prevented. Consequently, the damage of the diaphragm 306 at the deformation promoting portion 306a can be prevented.

Further, since the upper flat portion 307b forms substantially the same surface with the surface 311a of the plate 311 when the plate 311 and the step portion 307a come into contact, even if the pressure of the upstream space 301e rises and the pressure difference between the inside and outside of the closed space 305 becomes large, in the same way as with the lower flat portion 308b, large deformation of the diaphragm 306 between the upper flat portion 307b and the surface 311a can be suppressed and damage of the diaphragm 306 can be prevented.

Further, since the valve element 304 and the diaphragm 306 are configured so that the valve port 303 is closed when the diaphragm 306 displaces from the neutral state toward the valve element 304 side (other side in thickness direction of the diaphragm 306) and so that the opening degree of the valve port 303 (amount of displacement of the valve element 304 from the state where the valve port 303 is closed as a reference) becomes maximum when the diaphragm 306 displaces toward one side in the thickness direction, the diaphragm 306 will deform and displace to the other side and one side in the thickness direction of the diaphragm 306 from the Accordingly, the maximum amount of deformation and displacement of the diaphragm 306 can be made small in comparison with the maximum amount of displacement of the valve element 304, therefore in comparison with the case where the diaphragm 306 is deformed and displaced to only one side in the thickness direction from the neutral state, the maximum stress generated in the diaphragm 306 can be made small. Consequently, the durability of the diaphragm 306 can be improved.

Further, since a biasing force acts upon the valve element 304 from both sides in the thickness direction of the diaphragm 306, the valve element 304 and the diaphragm 306 can be moved (displaced) together without bonding (connecting) the valve element 304 and the diaphragm 306.

When the valve element 304 and the diaphragm 306 are joined by applying heat, e.g., welding, however, the metal crystalline structure of the diaphragm 306 changes, so there is a danger of a change of the characteristics of deformation and displacement of the diaphragm 306.

As opposed to this, in the present embodiment, the valve element 304 and the diaphragm 306 are not joined, therefore a change of the deformation and displacement characteristics of the diaphragm 306 can be prevented.

As clear also from the explanation of the operation and characteristic features given above, it is preferable that the temperature in the closed space 305 of the pressure control valve 3 ideally change linked with the outlet side temperature of the heat emitter 2 (temperature of the upstream space 301e) without a time difference.

As opposed to this, in the present embodiment, since the sealing pipe 313 having a larger heat conductivity than that of the upper support member 307 passes through the upper support member 307 extending between the inside and outside of the closed space 305, the difference between the temperature in the closed space 305 and the temperature of the upstream space 301e can be made small. Accordingly, the outlet side pressure of the heat emitter 2 is further raised to the pressure along the optimum control line $\eta_{max}$, therefore the $CO_2$ system more efficiently operate.

Second Embodiment

Figure 10A:
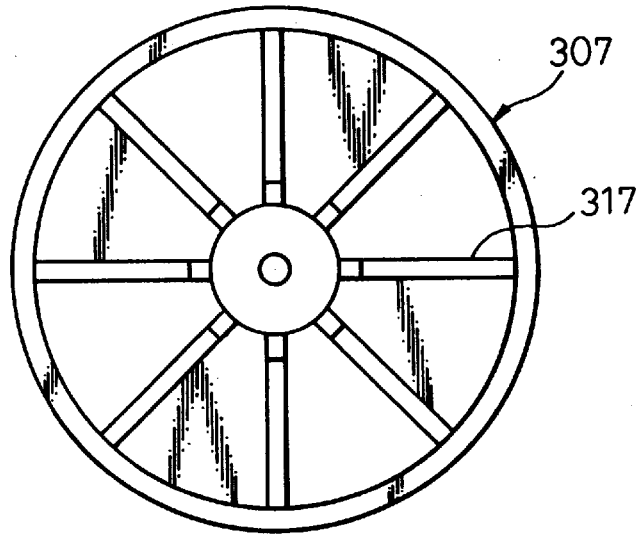
Figure 10B:
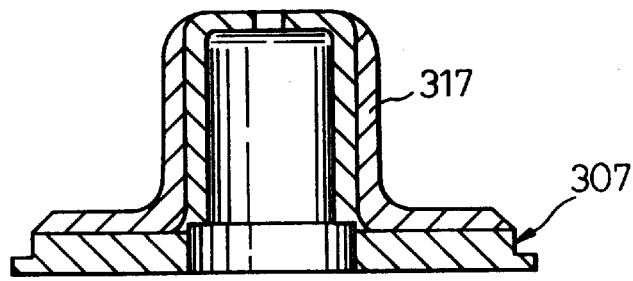
Figure 11:
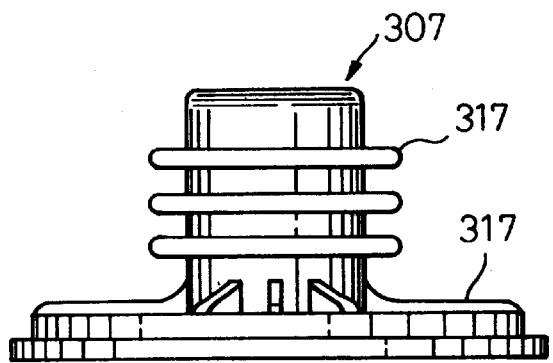
FIG. 11 is a front view of the upper support member showing a modification of the pressure control valve according to the second embodiment.

In the present embodiment, as shown in FIGS. 10A and 10B and FIG. 11, the projection portion 317 is formed at the upper support member 307 so as to project in the large thickness direction of the upper support member 307 in a variety of forms.

By this, the heat transfer coefficient between the upper support member 307 and the upstream space 301e and the withstanding pressure of the upper support member 307 can be improved. Consequently, it is possible to reduce the thickness of the upper support member 307, therefore the heat conduction between the upstream space 301e and the closed space 305 can be improved.

Note that, in the present embodiment, the projection portion 317 was provided on only the outer wall side (upstream space 301e side) of the upper support member 307, but the present invention is not limited to this. It is also possible to provide the projection portion 317 on the inner wall side (closed space 305 side) of the upper support member 307.

Third Embodiment

Figure 12:
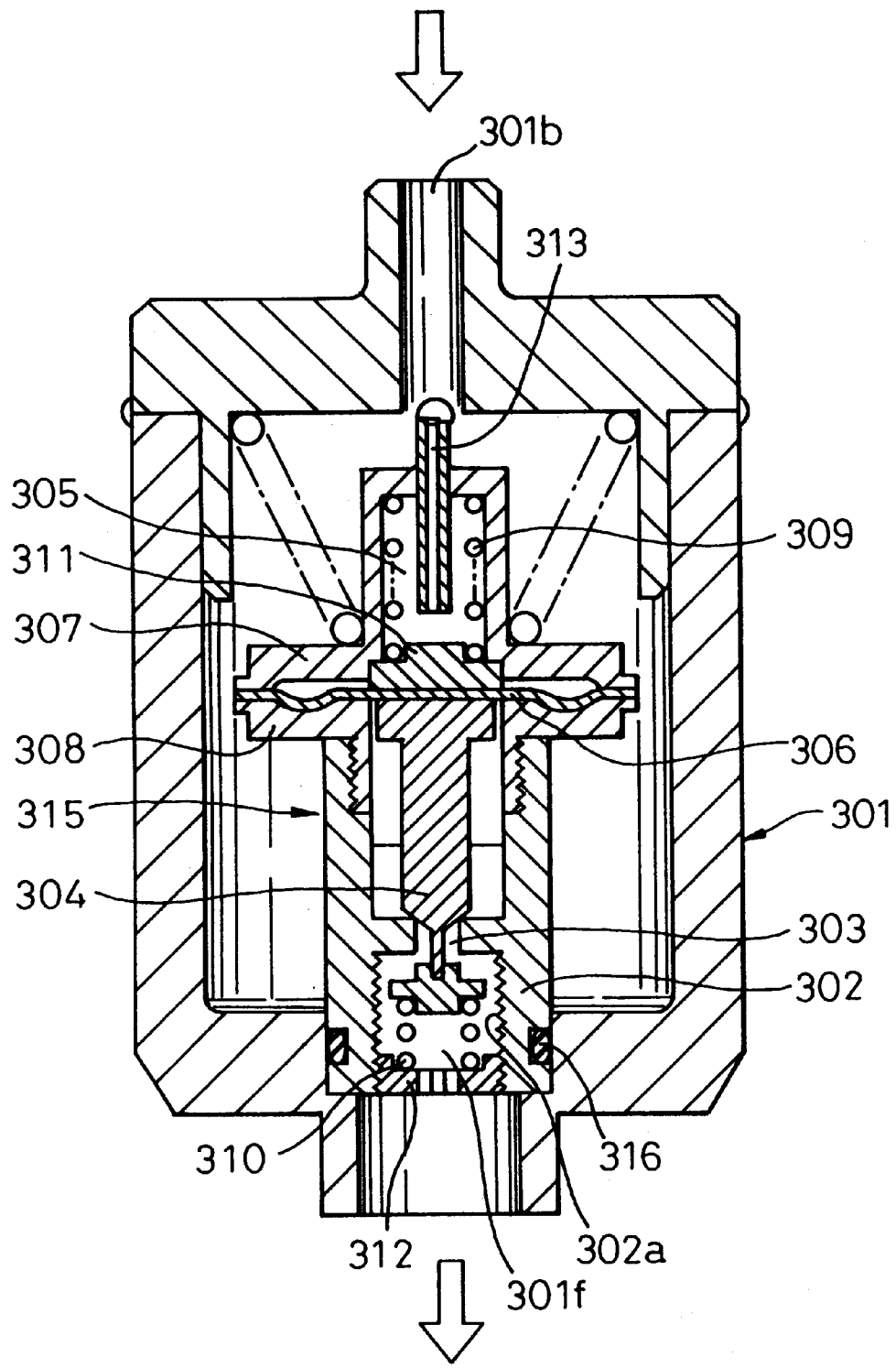
FIG. 12 is a sectional view of a pressure control valve according to a third embodiment of the present invention.
Figure 13:
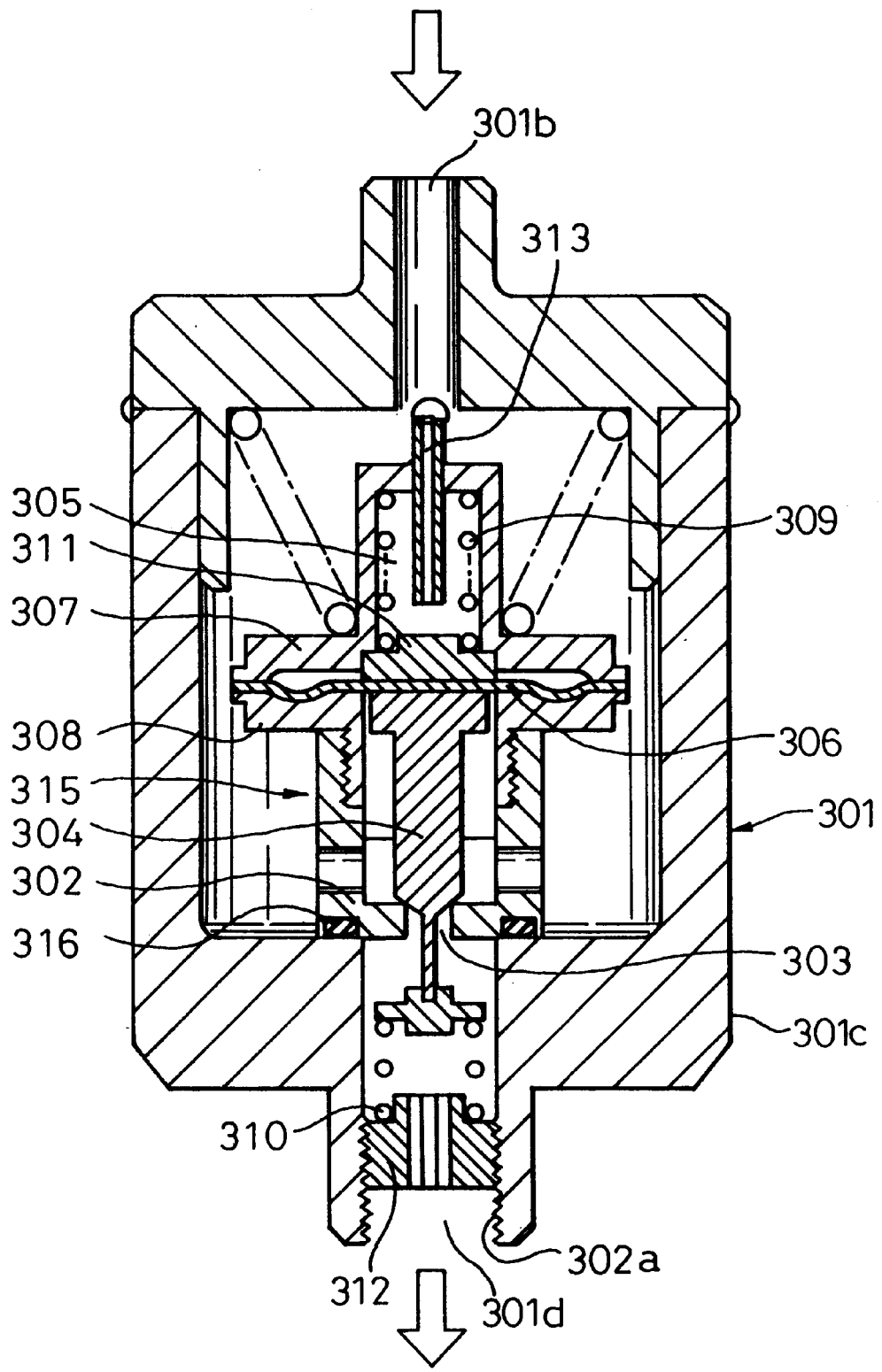
FIG. 13 is a sectional view of a pressure control valve according to a modification of the third embodiment.

In the present embodiment, as shown in FIGS. 12 and 13, the second coil spring 310 is arranged in the downstream space 301f. Note that, FIG. 12 is an example in which a female screw 302a is provided in the partition wall 302, and FIG. 13 is an example in which the female screw 302a is provided in the casing body 301c.

By this, even after the element case 315 is accommodated in the casing 301, the adjustment screw 312 can be turned from the inflow port 310b by a hexagon wrench or the like.

Fourth Embodiment

Figure 14:
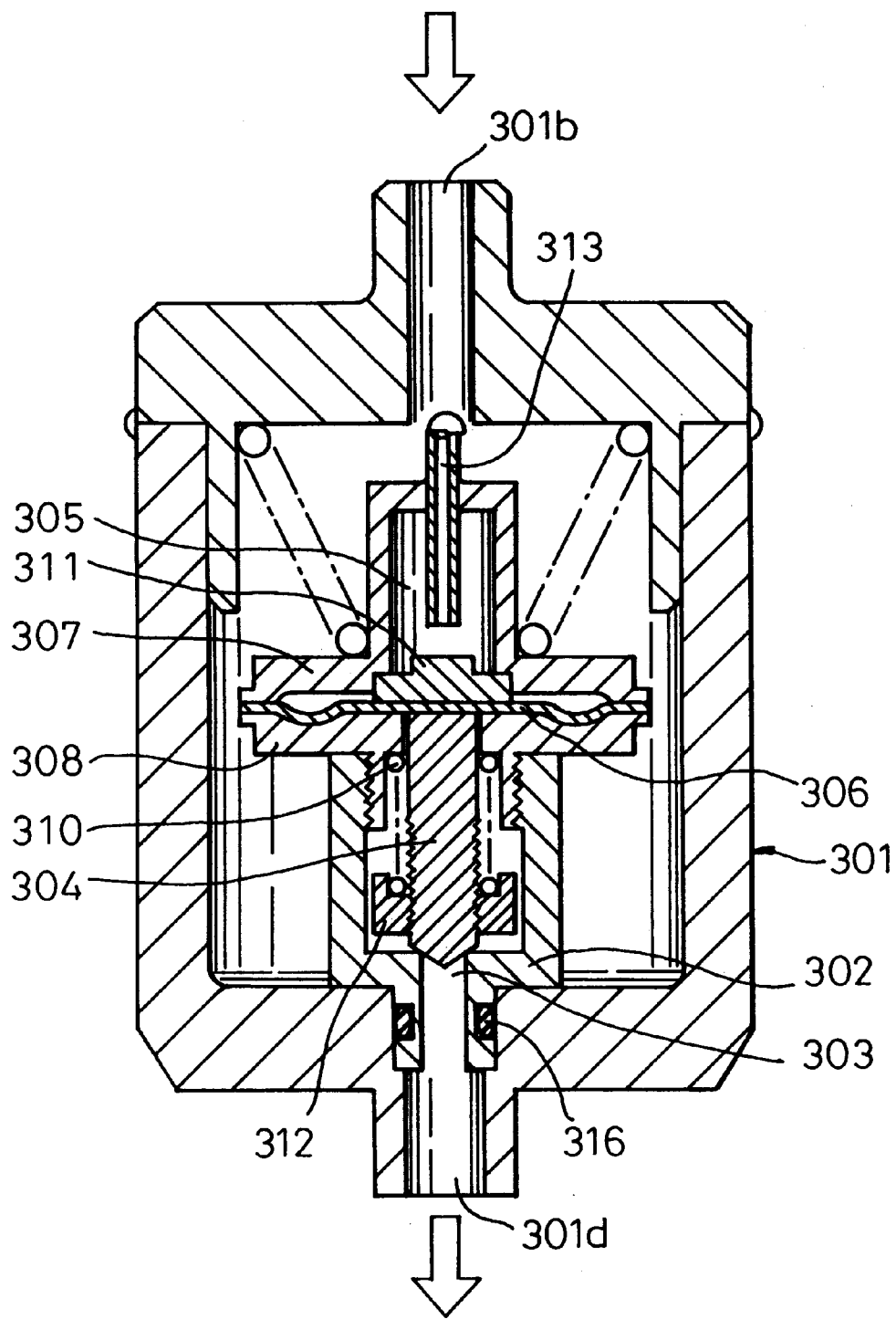
FIG. 14 is a sectional view of a pressure control valve according to a fourth embodiment of the present invention.
Figure 15:
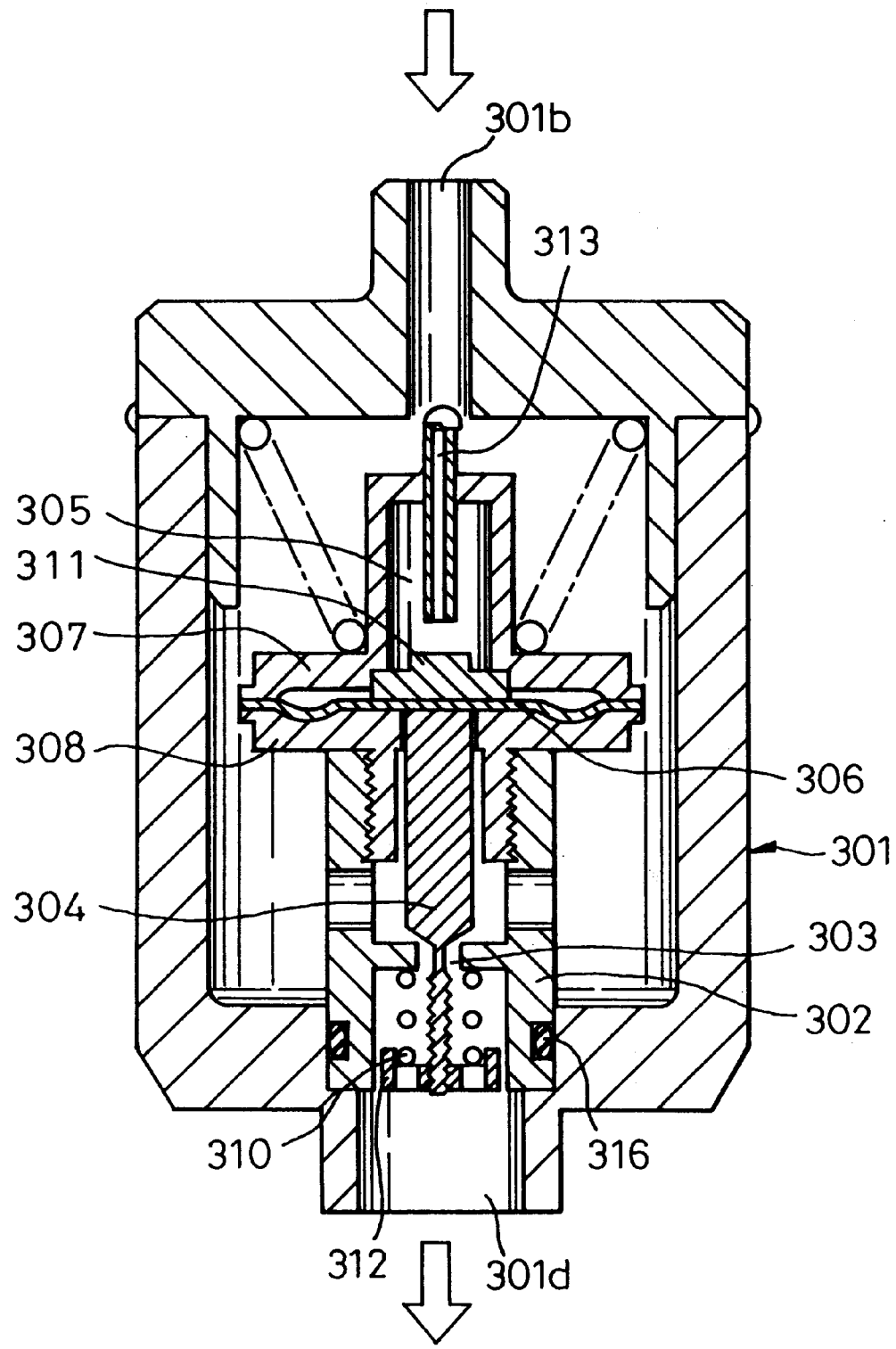
FIG. 15 is a sectional view of a pressure control valve according to a modification of the fourth embodiment.
Figure 16:
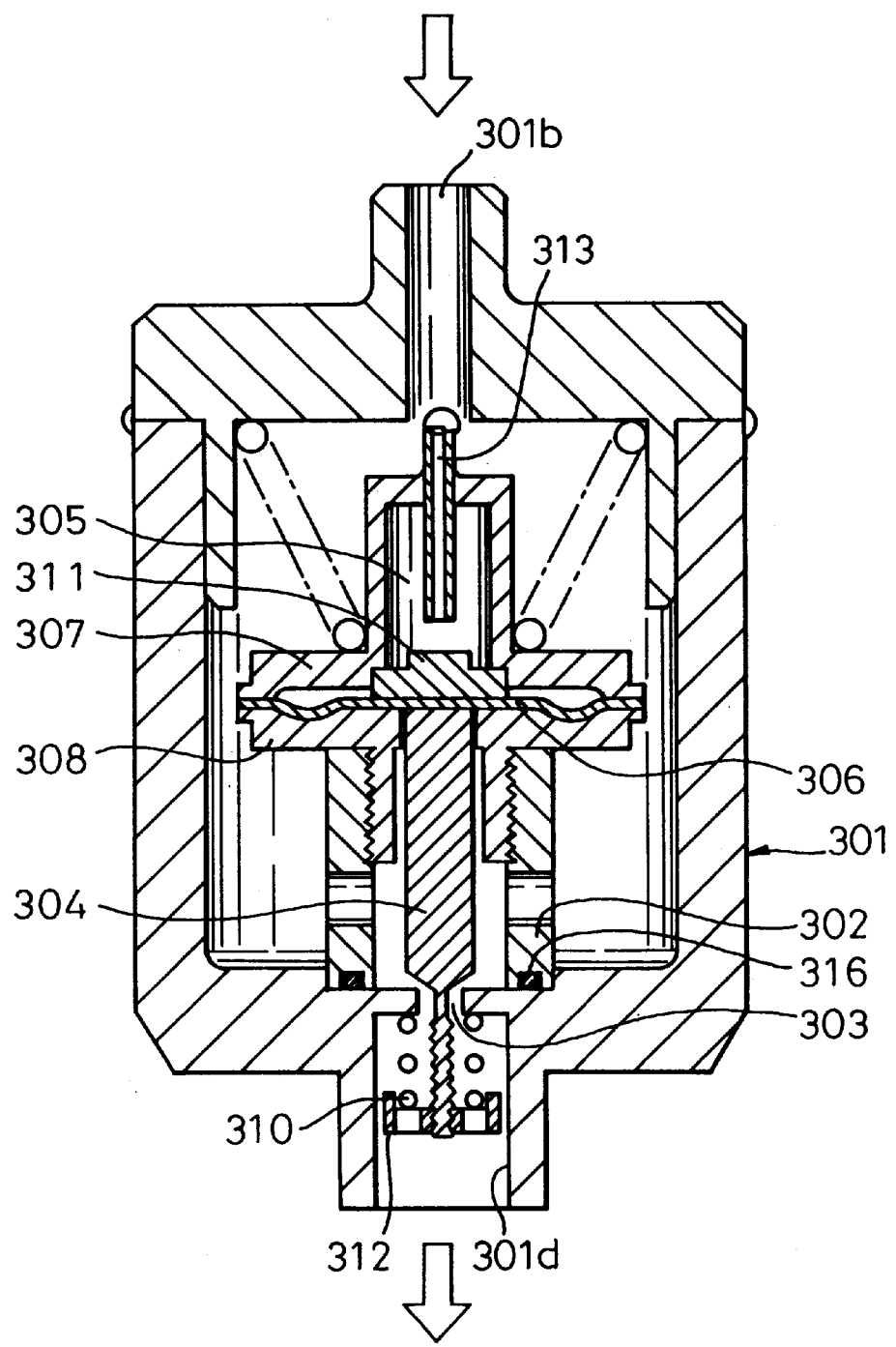
FIG. 16 is a sectional view of a pressure control valve according to another modification of the fourth embodiment.

In the present embodiment, as shown in FIGS. 14 to 16 illustrating three modifications, the first coil spring 309 is abolished, the valve element 304 and the plate (rigid body) 311 and the diaphragm 306 are joined and the biasing force of the second coil spring 310 is made to act upon the valve element 304 in the direction closing the valve port 303. Note that, in the present embodiment, a male screw is formed at the valve element 304, and a female screw is formed in the adjustment screw 312.

By this, the number of parts of the element case 315 (pressure control valve 3) can be decreased, therefore it is possible to reduce the prime cost of manufacture of the pressure control valve 3.

The pressure control valve according to the present invention is not limited to a vapor compression type refrigerating system using $CO_2$ and can be applied to also a vapor compression type refrigerating system using ethylene, ethane, nitrogen oxide, or another refrigerant for use in the super critical region.

Further, the above vapor compression type refrigerating system can operate even if the accumulator 5 is eliminated. In this case, the refrigerant remaining in the evaporator 4 is drawn in and a similar operation as that in a $CO_2$ system having the accumulator 5 can be obtained.

Note that in the present specification, for example, the meaning of the sentence "the valve element 304 and the diaphragm 306 come into contact" includes the case where a spacer (washer) or other separate part is interposed between the valve element 304 and the diaphragm 306. That is, even a part separate from the valve element 304 can be regarded as a part of the valve element 304 when it can integrally move with the valve element 304. Note that the same is true also for the case where a separate member is interposed between the plate 311 and the diaphragm 306.

Further, in the first to third embodiments, the diaphragm 306 and the valve element 304 were not joined, but it is also possible to join the diaphragm 306 and element 304 by welding or an adhesive. By this, the valve element 304 can be made to displace reliably following the diaphragm 306.

Further, it is also possible to make the plate 311 by a plastic in the above embodiments.

Further, damage to the diaphragm 306 can be prevented even if the lower flat portion 308b and the surface 304a are constituted so that they are located on substantially the same curved surface so long as there is no step difference between the lower flat portion 308b and the surface 304a. Similarly, it is also possible to have the upper flat portion 307b and the surface 311a located on substantially the same curved surface.

What is claimed is:

1. A pressure control valve applied to a vapor compression type refrigerating system wherein pressure in a heat emitter (2) exceeds a critical pressure of a refrigerant, arranged in a refrigerant flow path (6a) from said heat emitter (2) to an evaporator (4), and controlling an outlet side pressure of said heat emitter (2) in accordance with a refrigerant temperature on the outlet side of said heat emitter (2), comprising:

a partition wall (302) which is formed in said refrigerant flow path (6a) and partitions said refrigerant flow path (6a) into an upstream space (301e) and a downstream space (301f);

a valve port (303) which is formed in said partition wall (302) and communicates said upstream space (301e) and said downstream space (301f);

a formation member (307) provided in said upstream space (301e);

a thin film-like displacement member (306) which together with said formation member (307) forms a closed space (305) into which the refrigerant is sealed and displaces in accordance with a pressure difference between an inside and an outside of said closed space (305);

a valve element (304) which displaces linked with said displacement member (306) and opens or closes said valve port (303); and a through member (313) penetrating through said formation member (307) between the inside and outside of said closed space (305) and made of a material having a larger heat conductivity than that of said formation member (307).

2. A pressure control valve according to claim 1, wherein a projection portion (317) is formed at an outer wall surface of said formation member (307).

3. A pressure control valve according to claim 1, wherein said valve element (304) and said displacement member (306) are configured so that an opening degree of said valve port (303) becomes maximum when said displacement member (306) displaces from a neutral state toward one side in a thickness direction of said displacement member (306) and so that said valve port (303) is closed when it displaces toward the other side in the thickness direction.

4. A pressure control valve according to claim 1, wherein provision is further made of:

a first elastic member (309) which is arranged at one side of the thickness direction of said displacement member (306) and causes a biasing force of a direction closing said valve port (303) to act on said valve element (304) via said displacement member (306);

a second elastic member (310) which is arranged at the other side of the thickness direction of said displacement member (306) and causes a biasing force of a direction opening said valve port (303) to act on said valve element (304); and a biasing force adjustment mechanism (312) for adjusting the biasing force of said second elastic member (310) acting on said valve element (304).

5. A pressure control valve according to claim 1, wherein provision is further made of:

an elastic member (310) which is connected at the other side in the thickness direction of said displacement member (306) and causes a biasing force of a direction closing said valve port (303) to act on said valve element (304) and a biasing force adjustment mechanism (312) for adjusting the biasing force of said second elastic member (310) acting on said valve element (304).

6. A pressure control valve according to claim 1, wherein said closed space (305) has sealed in it a refrigerant at any density within a range from a saturated liquid density at a temperature of said refrigerant of 0° C. to a saturated liquid density at a critical point of said refrigerant with respect to a volume in said closed space (305) in a state where said valve port (303) is closed.

7. A pressure control valve according to claim 6, wherein:

said refrigerant is carbon dioxide; and the density in said closed space is 450 kg/m$^3$ to 850 kg/m$^3$.

8. A pressure control valve according to claim 1, further comprising a holding member (308) which has a holding flat portion (308b) which forms substantially the same surface with respect to a surface (304a) in contact with said displacement member (306) in said valve element (304) in a state where said valve port (303) is closed and which holds said displacement member (306).

9. A pressure control valve according to claim 8, wherein:

a displacement member deformed portion (306a) obtained by deforming part of said displacement member (306) in a corrugated shape is formed at an outward side of said displacement member (306) and a holding member deformed portion (308a) shaped like said displacement member deformed portion (306a) is formed at a position corresponding to said displacement member deformed portion (306a) in said holding member (308).

10. A pressure control valve according to claim 8, further comprising:

a rigid body (311) arranged at one side in the thickness direction of said displacement member (306), displacing integrally with said displacement member (306) in a state where it contacts said displacement member (306), and having a higher rigidity than that of said displacement member (306);

a stopper portion (307a) which is formed in said formation member (307) and limits said displacement member (306) from displacing by more than a predetermined amount toward one side in the thickness direction of said displacement member (306) by contacting with said rigid body (311); and a flat portion (307b) which is formed at said formation member (307) and forms substantially the same surface with a surface (311a) in contact with said displacement member (306) in said rigid body (311) when said rigid body (311) and said stopper portion (307a) come into contact.

11. A pressure control valve applied to a vapor compression type refrigerating system wherein pressure in a heat emitter (2) exceeds a critical pressure of a refrigerant, arranged in a refrigerant flow path (6a) from said heat emitter (2) to an evaporator (4), and controlling an outlet side pressure of said heat emitter (2) in accordance with a refrigerant temperature on the outlet side of said heat emitter (2), comprising:

a partition wall (302) which is formed in said refrigerant flow path (6a) and partitions said refrigerant flow path (6a) into an upstream space (301e) and a downstream space (301f);

a valve port (303) which is formed in said partition wall (302) and communicates said upstream space (301e) and said downstream space (301f);

a thin film-like displacement member (306) which forms the closed space (305) in said upstream space (301e) and displaces in accordance with the pressure difference between the inside and the outside of said closed space (305);

a formation member (307) which is arranged on one side in the thickness direction of said displacement member (306) and forms said closed space (305) together with said displacement member (306);

a holding member (308) which is arranged on the other side in the thickness direction of said displacement member (306) and holds and affixes said displacement member (306) together with said formation member (307);

a valve element (304) which contacts with said displacement member (306) on the other side in the thickness direction of said displacement member (306), displaces linked with said displacement member (306), and opens or closes said valve port (303); and a through member (313) penetrating through said formation member (307) between the inside and outside of said closed space (305) and made of a material having a larger heat conductivity than that of said formation member (307), wherein the refrigerant being sealed in said closed space (305) at a density within a range from the saturated liquid density at a temperature of said refrigerant of 0° C. to the saturated liquid density at the critical point of said refrigerant with respect to the volume in said closed space (305) in the state where said valve port (303) is closed.

* * * * *